(12) United States Patent
Reber et al.

(10) Patent No.: US 9,289,893 B2
(45) Date of Patent: Mar. 22, 2016

(54) ELECTRIC WORK APPARATUS WITH AN ELECTRIC LOAD AND A RECHARGEABLE BATTERY PACK

(71) Applicant: Andreas Stihl AG & Co. KG, Waiblingen (DE)

(72) Inventors: Volker Reber, Michelbach (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 467 days.

(21) Appl. No.: 13/726,358

(22) Filed: Dec. 24, 2012

(65) Prior Publication Data

US 2013/0162055 A1    Jun. 27, 2013

(30) Foreign Application Priority Data

Dec. 22, 2011  (DE) .......................... 10 2011 122 057

(51) Int. Cl.
| | |
|---|---|
| *H02J 1/00* | (2006.01) |
| *B25F 5/00* | (2006.01) |
| *H02J 7/00* | (2006.01) |
| *H01M 2/10* | (2006.01) |

(52) U.S. Cl.
CPC ................ *B25F 5/00* (2013.01); *H02J 7/0042* (2013.01); *B60L 2230/22* (2013.01); *H01M 2/1022* (2013.01)

(58) Field of Classification Search
USPC .................................................. 307/18, 150
See application file for complete search history.

(56) References Cited

U.S. PATENT DOCUMENTS

| | | |
|---|---|---|
| 5,818,201 A | 10/1998 | Stockstad et al. |
| 6,331,764 B1 | 12/2001 | Oglesbee et al. |
| 6,627,345 B1 | 9/2003 | Zemlok et al. |
| 6,841,291 B2 | 1/2005 | Minamiura |
| 7,073,614 B2 | 7/2006 | Saito et al. |
| 7,498,774 B2 | 3/2009 | Ziegler et al. |
| 7,553,583 B2 | 6/2009 | Eaves |
| 7,592,773 B2 | 9/2009 | Pellenc |
| 8,410,756 B2 | 4/2013 | Sakakibara et al. |
| 8,691,412 B2 | 4/2014 | Yonishi |
| 2004/0138785 A1 | 7/2004 | Emori et al. |

(Continued)

FOREIGN PATENT DOCUMENTS

| | | |
|---|---|---|
| CN | 102263217 A | 11/2011 |
| EP | 1 769 699 A1 | 4/2007 |

(Continued)

OTHER PUBLICATIONS

European Search Report of the European Patent Office dated Mar. 8, 2013 in the corresponding European patent application EP12008362.

(Continued)

*Primary Examiner* — Danny Nguyen
(74) *Attorney, Agent, or Firm* — Walter Ottesen P.A.

(57) ABSTRACT

An electric work apparatus having an electric load which is fed from a rechargeable battery pack. The battery pack is accommodated in a housing with the electric load being connected to the battery pack via an electric connecting cable. To provide cable guidance for the connecting cable that is ergonomically suitable for a user, cable ducts are molded in a housing wall of the backpack-type battery pack that is separate from the electric load. The cable duct opens in the edge of the housing as cable outlets.

27 Claims, 3 Drawing Sheets

(56) References Cited

U.S. PATENT DOCUMENTS

| | | |
|---|---|---|
| 2005/0057221 A1 | 3/2005 | Desilvestro et al. |
| 2005/0161305 A1 | 7/2005 | Jenni et al. |
| 2006/0196215 A1 | 9/2006 | Crumlin et al. |
| 2008/0050645 A1 | 2/2008 | Kai et al. |
| 2010/0123434 A1 | 5/2010 | Iwata |
| 2010/0181966 A1 | 7/2010 | Sakakibara |
| 2010/0221590 A1 | 9/2010 | Reber |
| 2010/0221591 A1 | 9/2010 | Rosskamp et al. |
| 2010/0320969 A1* | 12/2010 | Sakakibara et al. .......... 320/118 |
| 2010/0321025 A1 | 12/2010 | Lin et al. |
| 2011/0003182 A1 | 1/2011 | Zhu |
| 2011/0068744 A1 | 3/2011 | Zhu |
| 2011/0074354 A1 | 3/2011 | Yano |
| 2011/0097619 A1 | 4/2011 | Park |
| 2011/0248675 A1 | 10/2011 | Shiu et al. |
| 2011/0287287 A1 | 11/2011 | Kang |
| 2013/0162052 A1 | 6/2013 | Gaul et al. |
| 2013/0162217 A1 | 6/2013 | Gaul et al. |
| 2013/0163135 A1 | 6/2013 | Liebhard et al. |
| 2013/0164600 A1 | 6/2013 | Rosskamp et al. |

FOREIGN PATENT DOCUMENTS

| | | |
|---|---|---|
| FR | 2958083 A1 | 9/2011 |
| GB | 2 383 765 A | 7/2003 |
| GB | 2 409 832 A | 7/2005 |
| WO | 98/48470 A1 | 10/1998 |
| WO | WO 02/30631 A2 | 4/2002 |

OTHER PUBLICATIONS

Partial English translation and Chinese Search Report of the Chinese Patent Office dated Jun. 17, 2015 in the corresponding Chinese patent application CN20120560002.7.

\* cited by examiner

ELECTRIC WORK APPARATUS WITH AN ELECTRIC LOAD AND A RECHARGEABLE BATTERY PACK

CROSS REFERENCE TO RELATED APPLICATION

This application claims priority of German patent application no. 10 2011 122 057.0, filed Dec. 22, 2011, the entire content of which is incorporated herein by reference.

FIELD OF THE INVENTION

The invention relates to an electric work apparatus with an electric load which is fed from a rechargeable battery pack accommodated in a housing.

BACKGROUND OF THE INVENTION

Both in the private and in the professional sector, battery-operated work apparatus are being used more and more frequently. Powerful batteries such as batteries based chemically on lithium have a high energy density, so that even more demanding, longer tasks can be carried out with electric work apparatus. For example, battery-operated hedge trimmers, battery-operated power saws and battery-operated brush cutters are known, which have a battery pack inserted into the housing of the work apparatus.

If a great deal of work is to be carried out with brush cutters or hedge trimmers, larger battery packs have to be used in order to achieve long operating times, and are predominantly carried by the user separately from the electric work apparatus. In this case, a connecting cable connects the battery pack carried by the user to the electric load in the work apparatus, the connecting cable being connected to the battery pack via a connecting plug. The cable run of the connecting cable that results is arbitrary and, depending on the work to be carried out, can hinder or restrict the user in terms of the freedom of his movement. Given such cable guidance, the connecting plug is secured mechanically to the socket or the housing, in order that detachment of the connecting plug from its socket on the battery pack, occurring as a result of tensile forces on the cable, is prevented.

SUMMARY OF THE INVENTION

It is an object of the invention to configure a battery pack carried by the user for an electric load in a work apparatus in such a way that ergonomically advantageous cable guidance is provided for the user, which also reduces the pull-out forces occurring on a connecting plug.

The electric work apparatus of the invention includes: a battery pack; a housing configured to accommodate the battery pack therein and having a housing wall and an edge; an electrical load configured to be fed by the battery pack; an electrical connecting cable configured to connect the electrical load to the battery pack; the housing being configured as a backpack-type component which is separate from the electrical load; the housing having a cable duct formed in the housing wall; and, the cable duct having a cable outlet in the edge of the housing.

The battery pack, designed as a backpack-type assembly unit, has a cable duct molded in its housing wall which is led to the electric load of the work apparatus via a cable outlet in the housing edge of the battery pack. The user is provided by design with ergonomically advantageous cable guidance for the execution of any work, in which the connecting cable is led through the cable outlet from the battery back to the load. As a result of the—non-rectilinear—guidance in a cable duct, the result is also lower pull-out forces on the connecting plug in the event of an external tension force on the cable.

Advantageously, the backpack-type battery pack has at least one cable duct molded in the housing wall of the battery pack, which opens via different cable outlets in the housing edge of the battery pack, so that a connecting cable can be led on different routes to the electric load of the work apparatus. Before carrying out any work, the user has a free choice as to which cable guidance that is ergonomically suitable for him he chooses, in order then to lead the connecting cable through the appropriate cable outlet from the battery pack to the load.

Advantageously, the cable duct is formed as a groove, so that when the cable guidance is changed, the connecting cable can be removed and re-inserted simply.

As a further feature, provision is made to arrange the cable duct in an installation space between a housing wall of the housing and the cell pack arranged in the housing, and to form it to be open toward the outer surface of the housing wall. As a result, the cross section of the cable duct is accommodated recessed in the housing of the battery pack, without the overall volume of the housing being increased. The accessibility of the cable duct from outside the housing is further ensured.

The housing wall preferably includes a back plate of the housing, a cable duct being molded in the back plate itself. The back plate is advantageously shaped so as to match the back of a user, for example curved; in this case an empty space is formed between the cell pack of the battery pack held in the housing and the inner wall of the housing, which, as installation space, accommodates the volume of a cable duct. Thus, in a straightforward manner, a cable duct is accommodated in the installation space between the outer surface of the back plate and the cell pack arranged in the housing and is configured as a groove open toward the outer surface of the back plate, so that transferring the connecting cable from one cable outlet to another can be done in a simple manner.

Advantageously, the installation space is an empty space; it may also be practical to provide the empty space as a material-filled space, for example by means of appropriate design of the back plate. The cross section of the cable duct—apart from the open side thereof—is then completely embedded in the material.

In addition, an electric terminal box recessed in the back plate is provided. The cable duct advantageously runs recessed in the back plate, starting from the terminal box as far as the cable outlet in the area of the housing edge. The cable, led between the back of the user and the housing of the battery pack, is thus located completely within the external contour of the housing of the battery pack, so that, irrespective of the choice of the cable cutlet, the user does not notice any interfering segments of cable.

In order to have a suitable choice of the possible ways of guiding the connecting cable, provision is made to form a plurality of cable outlets in a narrow side of the housing. In this way, a plurality of cable outlets can be arranged in a lateral vertical side of the housing so that the cable guidance can be matched simply to the size of a user.

If at least one cable outlet is located in the edge of the housing on each side of the vertical longitudinal axis of the back plate, the guidance of the connecting cable can be changed over in a straightforward way for left-handed or right-handed users.

The end section of a cable duct, opening into the cable outlet in the area of the vertical sides of the housing, is located at an outlet angle that is not equal to 90° with respect to the vertical side itself. Expediently, the outlet angle is chosen to be less than 90°, preferably about 45°, and is located with its angular opening facing the base of the housing, so that the connecting cable led out through the outlet in the cable duct runs downward, following gravity, and can thus easily be led through under the arm of a user.

The cable duct is advantageously formed such that it branches in the direction of the narrow side of the housing via a branch to a further cable outlet. If the user wishes to choose another cable outlet, then the connecting cable needs to be taken out of the cable duct only as far as the branch and not over its entire length. In a particular embodiment, the end sections of the ducts run approximately parallel to one another to the cable outlets in a vertical side.

All the cable outlets located on one longitudinal side in the housing edge of the battery pack each open into a common cable duct. When the connecting cable is transferred to another cable outlet on the same side of the longitudinal axis, the connecting cable needs to be released from the cable duct only over part of its length.

All the cable outlets located in the edge of a lateral vertical side are located below a mid-plane of the back plate, therefore—depending on the size of the user—run approximately in the area of the elbow of a user and are thus ergonomically beneficially located.

The electric terminal box with electronics and the connecting plug of the connecting cable is arranged in the upper end region of the back plate, below the upper narrow side of the housing opposite the base of the housing. As a result, the electronics are located with a sufficient spacing above the base, so that contamination, spray water and so on cannot lead to any impairment to the electrical connections. Furthermore, because of the position of the terminal box, an appropriate length of the connecting cable is led in the cable duct, which means that strain relief of the connecting plug is achieved in the terminal box. In the event that the work apparatus falls, moreover, the connecting cable is first pulled out of the cable duct, so that mechanical forces are dissipated.

In order to ensure secure fixing of the connecting cable in the groove-shaped cable duct, provision is made to form clamping struts on the duct walls of the cable duct. In this case, the clamping struts of one duct wall are located so as to be offset from the clamping struts of the opposite duct wall, which achieves good clamping of the connecting cable without the forces for pulling the cable out of the cable duct for the purpose of choosing another cable outlet becoming too high.

Advantageously, the base of the housing of the battery pack is formed as a stable foot, so that the user can set the battery pack safely down vertically on the ground.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
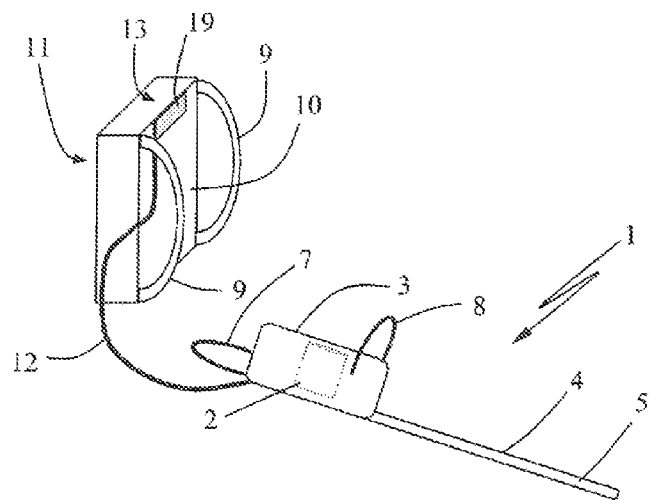
FIG. 1 shows a schematic illustration of an electric work apparatus with a backpack-type battery pack.
Figure 2:
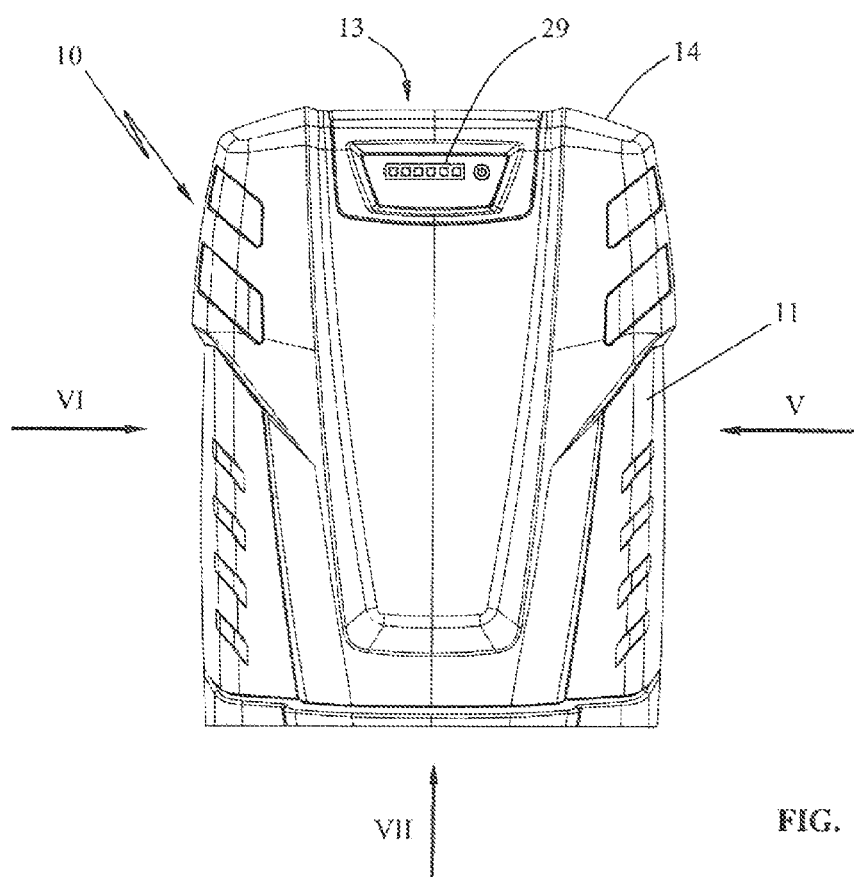
FIG. 2 shows a view of a battery pack from behind.
Figure 3:
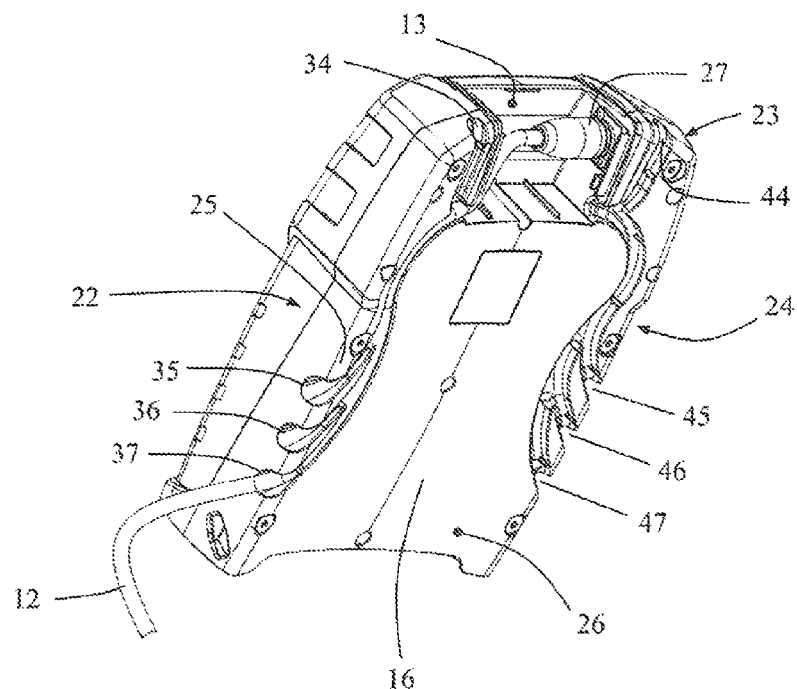
FIG. 3 shows a perspective view of the battery pack, according to FIG. 2.

The battery pack 10 shown in FIGS. 2 to 7 is provided for an electric work apparatus 1, as illustrated by way of example in FIG. 1. In the exemplary embodiment shown, the work apparatus is an electric hedge trimmer having an electric drive motor 2, which forms the electric load 3. The electric drive motor 2 of the shown work apparatus 1 is arranged at the one end of a cutting blade bar 4 which has two cutter blades 5 moving back and forth as a tool.

The housing of the work apparatus 1 has a handle as a front-handgrip 7 and a further handle as a rear handgrip 8, via which a user guides the electric work apparatus 1. For the purpose of supplying power to the electric load 3, the battery pack 10 is provided, which is formed as a backpack-type assembly unit 11 and is fixed to the back 15 of a user (FIG. 6) by carrying straps 9. The battery pack 10 is connected to the electric load 3 of the work apparatus 1 via an electric connecting cable 12. The connecting cable 12 on the side of the battery pack 10 is connected by one end in a terminal box 13.

Instead of a hedge trimmer, a blower, a motor chainsaw, a brush cutter, a pole pruner, an angle grinder or similar apparatus can also be connected to the battery pack 10 as a work apparatus 1.

Figure 7:
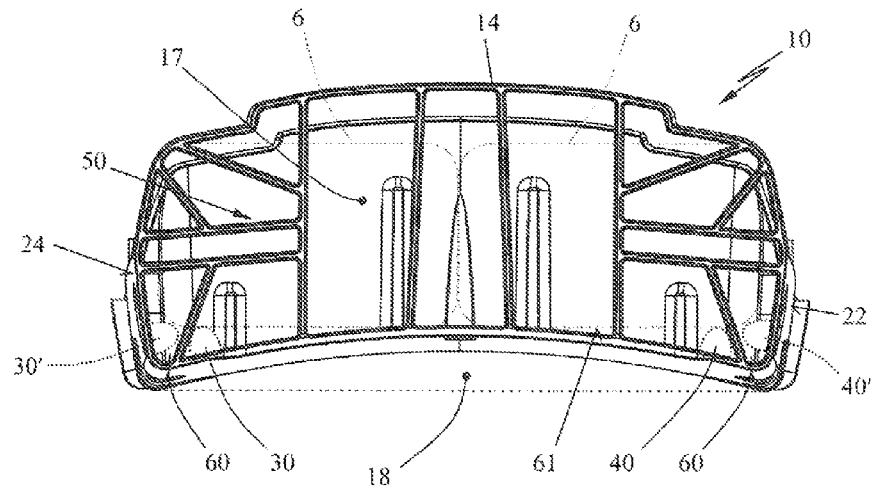

The housing 14 of the battery pack 10 is designed as an assembly unit 11 separate from the electric load 3 and essentially includes a back plate 16 (FIGS. 3 and 4) which faces the back 15 of a user (FIG. 6) and which is approximately perpendicular to a base 17 of the housing 14. As FIG. 7 shows, the back plate 16 is curved inward slightly and forms an anatomically matched support 18 for the back 15 of a user; with respect to the user, the back plate 16 is completely closed and therefore has no apertures or openings for cooling air or the like.

The back plate 16 has an approximately rectangular outline, the longitudinal mid-axis 20 of which is perpendicular to the base 17 and forms a vertical axis. Located orthogonally with respect to the vertical longitudinal mid-axis 20 is a horizontal mid-plane 21 of the back plate 16. The battery pack 10 inserted into the housing 14 includes box-shaped cell packs 6 (FIG. 7), which are inserted info corresponding receiving spaces in the housing 14 and are retained therein. The cell packs 6 form a substantially flat surface 61 as compared with the curved back plate 16, so that between the back plate 16 and the cell packs 6 there are formed empty spaces which, in the context of a further invention, can be used as installation space 60 to receive cable ducts, as described below.

In the shown embodiment, the installation space 60 is free of material and is therefore an empty space; it can be advantageous to fill the empty space with material, for example, by the back plate 16 being of thickened design in the appropriate edge regions.

The vertical sides 22 and 24 extending parallel to the longitudinal mid-axis 20 form first narrow sides of the housing 14; the vertical sides 22 and 24 are connected to each other at their ends, firstly via the base 17 and secondly via an upper narrow side 23. Between the back plate 16 and the narrow sides (vertical sides (22, 24), upper narrow sides 23 and base 17), there is formed a first edge 25 of the housing 14, which is also designated a housing edge below.

In order to permit the user freely selectable, ergonomically suitable cable guidance, in one housing wall of the housing 14, in the back plate 16 of the battery pack 10 in the shown embodiment, there are formed cable ducts (30, 40) (FIG. 4) which, in the exemplary embodiment, are configured as open, U-shaped grooves. According to a further independent invention, the cable ducts (30, 40) are laid such that they are located in the free installation space 60 between the back plate 16 and the cell blocks 6 of the battery pack 10, so that the volume of each duct is preferably accommodated completely in the installation space 60. If the installation space 60 is a free, empty installation space, the ducts project, into the latter. If the installation space 60 is a filled installation space, for example filled with the material of the back plate 16 or with another material, the cable duct is accommodated in the material, preferably accommodated completely. Furthermore, each groove is open substantially over its entire length to the outer surface 26 of the back plate 16 that faces the back 15 of the user. The cross section of the open cable duct (30, 40) is preferably rounded, in particular configured so as to correspond to the shape of the connecting cable 12.

In general, the further invention consists in using a clearance, resulting from the design of the housing 14, the matching of the housing 14 to the back of a user and the cell pack held in the housing 14 of the battery pack 10, as an installation space 60 for providing a cable duct (30, 40). For example, a cable duct 30' or 40' can be accommodated in an installation space 60 between a housing wall (for example a side wall (22, 24)) of the housing 14 and the ceil pack 6 arranged in the housing 14. The installation space 60, which results in design terms on account of the anatomical curvature of the back plate 16 for the purpose of matching the user, is advantageously used for cable ducts (30, 40).

A cable duct 30 opens in the edge 25 of the housing 14 as cable outlets 34 to 37 and a cable duct 40 opens in edge 25 as cable outlets 44 to 47. The cable outlets 34 to 37 and 44 to 47 are located at a distance u, v or w from one another as measured in the circumferential direction of the housing edge 25. Each cable duct (30, 40) runs from the terminal box 13 as far as the particular cable outlet in a manner recessed in the back plate 16. A plurality of cable outlets 34 to 37 and 44 to 47 are advantageously provided over the circumference of the housing edge 25.

Thus, a plurality of cable outlets are located in a narrow side of the housing, for example two cable outlets 34 and 44 at a distance (w) from each other in the upper narrow side 23; in the one long narrow side of the housing 14, the vertical side 22, three cable outlets (35, 36, 37) are located at a distance (u) from one another, and in the other vertical side 24, the cable outlets (45, 46, 47), are likewise at a distance (u) from one another. According to the embodiment, provision is made tor three cable outlets 35 to 37 and 45 to 47 to be formed in each of the vertical sides 22 and 24; it may be practical to form more than three cable outlets or even less.

According to an embodiment of the invention, provision is made for each cable duct (30, 40) to branch over its length to form the cable outlets 34 to 37 and 44 to 47, respectively. Thus, shortly after the outlet from the terminal box 13, the cable duct 10 has a first branch 31, the branch duct of which opens via an end section 31a into the cable outlet 34 in the housing edge 25 of the upper narrow side 23. After the branch 31, the remaining cable duct 30 runs in an S-shaped curve in the direction of the base 17 of the housing 14 and ends at the cable outlet 37 in the housing edge 25 of the vertical side 22. From the S-shaped cable duct 30, approximately at the height of the mid-plane 21, a further branch 32 branches off, which leads a further branch duct via an end section 35a to the cable outlet 35. In a corresponding manner, a further branch 33 following in the longitudinal direction of the cable duct 30 is provided, in order to lead via a next branch duct and an end section 36a to the cable outlet 36 in the housing edge 25 of the vertical side 22.

In a corresponding manner, the cable duct 40 is led via branches 41, 42 and 43 and branch ducts and their end sections 44a, 45a, 46a and 47a to the cable outlets 44, 45, 46 and 47 on the other side of the longitudinal mid-axis 20 of the back plate 16.

The arrangement according to the embodiment is formed in such a manner that, at lease one cable outlet is provided in the edge 25 of the housing 14 on each side of the vertical longitudinal mid-axis 20. According to FIG. 4, a cable outlet 34 and 44 each is provided both in the upper narrow side 23 on both sides of the longitudinal mid-axis 20 and also in the vertical sides 22 and 24, in which, three cable outlets 35, 36 and 37 and 45, 46 and 47, respectively, are provided.

Figure 4:
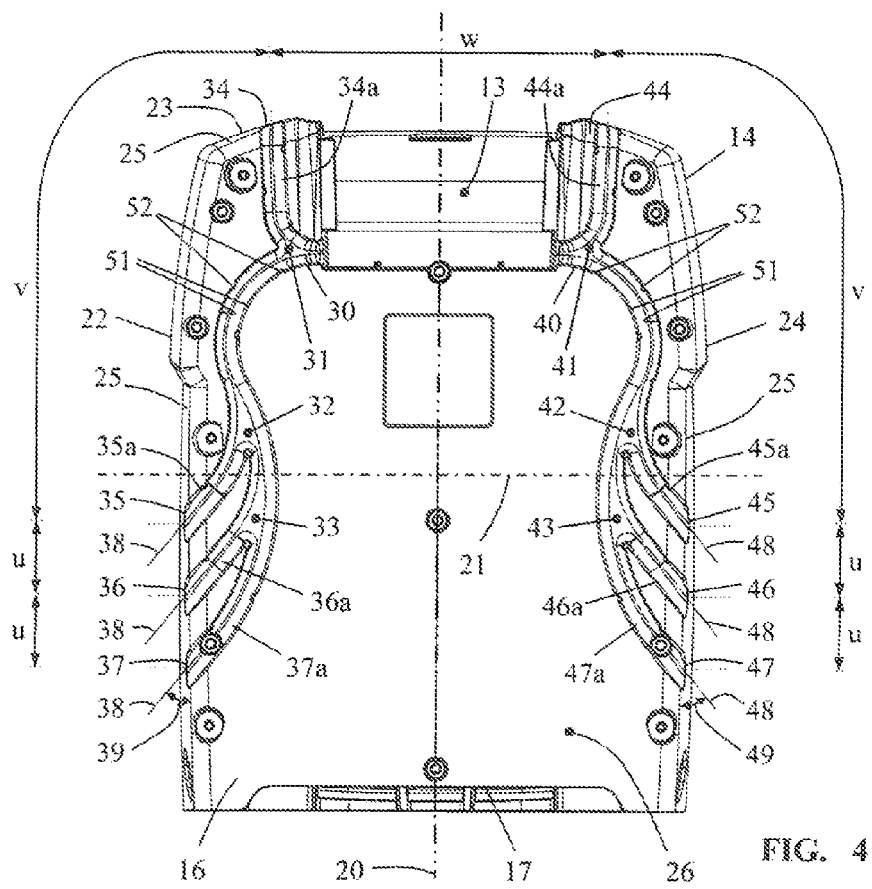
FIG. 4 shows a plan view of the back plate of the battery pack according to FIG. 3.
Figures 5, 6:
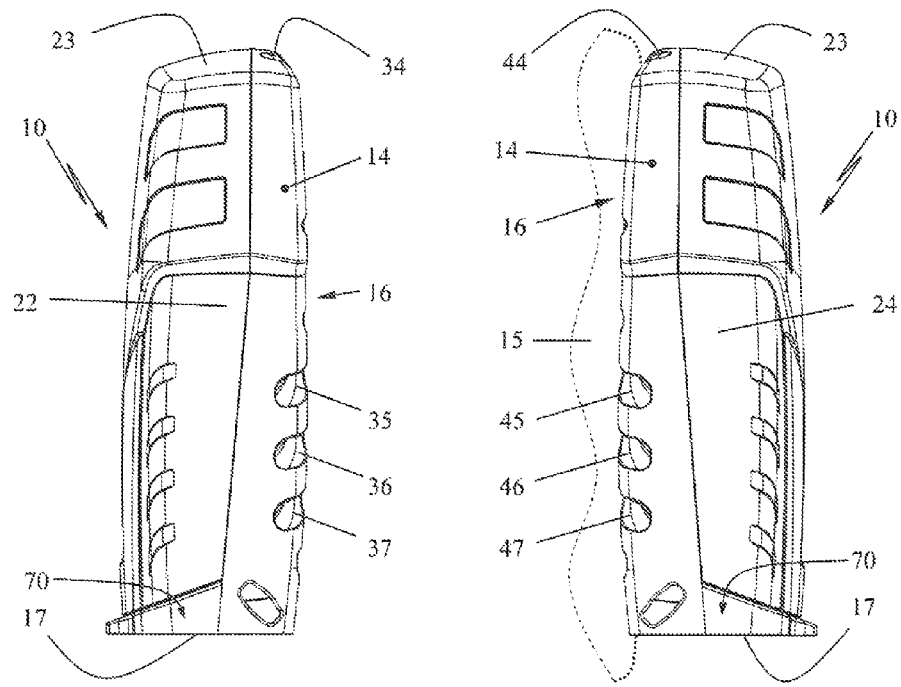
FIG. 5 shows a view of a vertical side of the battery pack according to arrow V in FIG. 2.
FIG. 6 shows a view of the other vertical side of the battery pack according to arrow VI in FIG. 2; and, FIG. 7 shows a plan view of the base of the battery pack according to arrow VII in FIG. 2.

The end sections (35a, 36a, 37a) and (45a, 46a, 47a) of the cable ducts (30, 40) lie approximately parallel to one another, the longitudinal axes 38 of the end sections having an outlet angle 39 with respect to the vertical side 22 which is not equal to 90°. As shown in FIG. 4, the outlet angle 39 opens in the direction of the base 17 of the housing 14 and is designed to be less than 90°, preferably selected to be about 45°.

In a corresponding manner, the longitudinal axes 48 of the end sections 45a, 46a and 47a of the cable duct 40 on the other side of the vertical longitudinal mid-axis 20 lie approximately parallel to one another and at an outlet angle 49 with respect to the vertical side 24 of which the angle opening lies toward the base 17 and, in the exemplary embodiment, is preferably about 45°.

As FIG. 4 also shows, the cable outlets (35, 36, 37) and (45, 46, 47) provided in the housing edge 25 of the vertical sides 22 and 24 are located below the mid-plane 21, that is, in the lower region of the back plate 16. All cable outlets (34, 35, 36, 37) on one side of the vertical longitudinal mid-axis 20 and all cable outlets (44, 45, 46, 47) on the ether side of the vertical longitudinal mid-axis 20 open into respective common cable ducts (30, 40) which originate directly from the terminal box 13.

The terminal box 13, which (see FIG. 1) is closed by a cover 19, completely accommodates a connecting plug 27 of the connecting cable 12. In the terminal box 13, there can also be arranged electronics provided to monitor or indicate the capacity of the battery pack 10. Monitoring electronics are always practical when the battery pack includes lithium-ion cells or similar individual cells based chemically on lithium.

The electric terminal box 13 is provided in the upper end region of the back plate 16, below the upper narrow side 23. The opening of the terminal box 13 extends into the upper narrow side 23 as into the back plate 16. On both ends of the terminal box 13, a cable outlet 34 and 44 is provided in each case.

The configuration of the cable ducts (30, 40) makes it possible for the user to lead the connecting cable 12 from the battery pack 10 to the electric load 3 at a point that is ergonomically suitable to the user. If, for example a brush cutter according to FIG. 1 is used, it is advantageous to lead the connecting cable 12 underneath the elbow of the user to the motor, for which purpose—depending on the size of the user—the cable outlets (35, 36, 37) or (45, 46, 47) are suitable. Since the cable outlets are provided on both sides of the longitudinal axis 20, ergonomic guidance of the connecting cable is ensured both for right-handed and for left-handed users.

If, for example, an electric pole pruner is operated with the battery pack and the user has to work substantially overhead, then the connecting cable 12 can be led from the battery pack 10 to the electric load 3 via the cable outlets 33 and 44, which ensures ergonomically beneficial cable guidance for overhead work as well.

The back plate 16 forms an approximately L-shaped outline with the base 17, the base 17 being provided with ribbing 50, which is open toward the base (see FIG. 7) in order to absorb loads that occur. The base 17 defines a stand 70, on which the battery pack 10 can be set down vertically. The stand 70 ensures safe setting down by the user in the carrying position of the battery pack 10.

In order to indicate the state of charge of the backpack-style battery pack 10, in the lid of the housing 14, located facing away from the back 15 of the user, a bar-like state of charge indicator 29 is provided, which is located at the height of the terminal box 13. In this manner, the corresponding electronics can be arranged close to the state of charge indicator 29 in the terminal box 13. The indicator can also be formed as a display, for example an LCD display, can be built up from individual optical indicators such as LEDs, for example, or else include acoustic indicators when, for example, the residual capacity of the battery pack falls below a predefined threshold value.

In order to fix the connecting cable 12 guided in a section of the cable duct 30 or 40 selected by the user, clamping struts 52 are formed on opposite duct walls 51 of the cable duct 30 and 40. The clamping struts extend over the height of the duct, the clamping struts 52 of the one duct wall 51 being located offset with respect to the clamping struts 52 of the opposite duct wall 51. Clamping struts 52 of this type are provided distributed over the entire length of the cable ducts (30, 40) and the respective branch ducts as far as the corresponding cable outlets (34, 35, 36, 37; 44, 45, 46, 47), It is understood that the foregoing description is that of the preferred embodiments of the invention and that various changes and modifications may be made thereto without departing from the spirit and scope of the invention as defined in the appended claims.

What is claimed is:

1. An electric work apparatus comprising:
   a battery pack;
   a housing configured to accommodate said battery pack therein and having a housing wall and an edge;
   an electrical load configured to be fed by said battery pack;
   an electrical connecting cable having a predetermined length and being configured to connect said electrical load to said battery pack;
   said housing being configured as a backpack-type component which is separate from said electrical load;
   said housing having a cable duct formed in said housing wall;
   said cable duct having a cable outlet in said edge of said housing; and,
   said electrical connecting cable being guided over a portion of said length thereof in said cable duct.

2. An electric work apparatus comprising:
   a battery pack;
   a housing configured to accommodate said battery pack therein and having a housing wall and an edge;
   an electrical load configured to be fed by said battery pack;
   an electrical connecting cable configured to connect said electrical load to said battery pack;
   said housing being configured as a backpack-type component which is separate from said electrical load;
   said housing having a cable duct formed in said housing wall;
   said cable duct having a cable outlet in said edge of said housing;
   said cable duct having at least two of said cable outlets in said edge of said housing;
   said edge of said housing defining a peripheral direction; and,
   said cable outlets being disposed at a distance to each other measured in said peripheral direction.

3. The work apparatus of claim 2, wherein said cable duct is configured as a channel.

4. An electric work apparatus comprising:
   a battery pack;
   a housing configured to accommodate said battery pack therein and having a housing wall and an edge;
   an electrical load configured to be fed by said battery pack;
   an electrical connecting cable configured to connect said electrical load to said battery pack;
   said housing being configured as a backpack-type component which is separate from said electrical load;
   said housing having a cable duct formed in said housing wall;
   said cable duct having a cable outlet in said edge of said housing;
   said battery pack including a cell pack arranged in said housing;
   said housing wall including a back plate;
   said housing wall defining an outer surface;
   said back plate and said cell pack conjointly defining an installation space therebetween; and,
   said cable duct being accommodated in said installation space and being open toward said outer surface of said housing wall.

5. The work apparatus of claim 4, wherein said cable duct is disposed in said back plate.

6. The work apparatus of claim 4, wherein:
   said back plate defines a portion of said outer surface;
   said portion of said outer surface of said back plate and said cell pack conjointly define said installation space therebetween; and,
   said cable duct is arranged in said installation space and is open to said portion of said outer surface.

7. The work apparatus of claim 4, wherein said installation space is an empty space.

8. The work apparatus of claim 5, further comprising an electrical terminal box arranged in said back plate in a recessed manner.

9. The work apparatus of claim 8, wherein said cable duct runs in a recessed manner in said back plate from said terminal box to said cable outlet.

10. The work apparatus of claim 2, wherein:
    said edge of said housing defines a narrow side thereof; and,
    a plurality of said cable outlets are disposed in said narrow side of said housing.

11. The work apparatus of claim 10, wherein:
    said housing has an upwardly extending side; and,
    a plurality of said cable outlets are disposed in said upwardly extending side of said housing.

12. The work apparatus of claim 5, wherein:
    said cable duct has a plurality of said cable outlets;
    said back plate has a vertical longitudinal center axis defining a first section on one side of said vertical longitudinal center axis and a second section on the other side of said vertical longitudinal center axis; and,
    at least one of said cable outlets is disposed in said edge of said housing in said first section and at least one of said cable outlets is disposed in said edge of said housing in said second section.

13. An electric work apparatus comprising:
a battery pack;
a housing configured to accommodate said battery pack therein and having a housing wall and an edge;
an electrical load configured to be fed by said battery pack;
an electrical connecting cable configured to connect said electrical load to said battery pack;
said housing being configured as a backpack-type component which is separate from said electrical load;
said housing having a cable duct formed in said housing wall;
said cable duct having a cable outlet in said edge of said housing;
said housing having a vertical side;
said cable duct having end sections which open into said cable outlet; and,
said end sections defining an outlet angle to said vertical side which is unequal to 90°.

14. The work apparatus of claim 13, wherein:
said housing has a base;
said outlet angle is less than 90° and has an angle opening which faces said base.

15. The work apparatus of claim 14, wherein said outlet angle is approximately 45°.

16. An electric work apparatus comprising:
a battery pack;
a housing configured to accommodate said battery pack therein and having a housing wall and an edge;
an electrical load configured to be fed by said battery pack;
an electrical connecting cable configured to connect said electrical load to said battery pack;
said housing being configured as a backpack-type component which is separate from said electrical load;
said housing having a cable duct formed in said housing wall;
said cable duct having a cable outlet in said edge of said housing;
said edge of said housing defining a narrow side; and,
said cable duct being bifurcated so as to cause said cable duct to branch off to a further cable outlet.

17. The work apparatus of claim 16, wherein:
said cable duct has an end section for each of said cable outlets and each of said end sections opens into the respective one of said cable outlets; and,
said end sections of said cable duct are approximately parallel to each other.

18. The work apparatus of claim 16, wherein:
said housing wall includes a back plate defining a vertical longitudinal center axis; and,
each of said cable outlets on the same side of said longitudinal center axis are connected to a common cable duct.

19. The work apparatus of claim 11, wherein:
said upwardly extending side is a lateral upwardly extending side of said housing;
said back plate defines an imaginary center plane; and,
each of said cable outlets disposed in said edge of said housing in said lateral upwardly extending side is disposed below said imaginary center plane.

20. The work apparatus of claim 8, wherein:
said housing has a base and said edge includes an upper narrow side disposed opposite said base;
said back plate has an upper end region; and,
said electrical terminal box is arranged in said upper end region of said back plate below said upper narrow side.

21. The work apparatus of claim 20, wherein respective cable outlets are formed in said upper narrow side on each end of said electrical terminal box.

22. The work apparatus of claim 2, wherein said cable duct has duct walls on which clamping struts are formed.

23. An electric work apparatus comprising:
a battery pack;
a housing configured to accommodate said battery pack therein and having a housing wall and an edge;
an electrical load configured to be fed by said battery pack;
an electrical connecting cable configured to connect said electrical load to said battery pack;
said housing being configured as a backpack-type component which is separate from said electrical load;
said housing having a cable duct formed in said housing wall;
said cable duct having a cable outlet in said edge of said housing;
said cable duct having duct walls on which clamping struts are formed;
said cable duct having a first duct wall and a second duct wall; and,
said struts on said first duct wall being offset from said struts on said second duct wall.

24. The work apparatus of claim 2, wherein said housing has a base configured as a stand.

25. The work apparatus of claim 4, wherein said housing has a base configured as a stand.

26. The work apparatus of claim 13, wherein said housing has a base configured as a stand.

27. The work apparatus of claim 16, wherein said housing has a base configured as a stand.

* * * * *